US011971147B2

(12) United States Patent
Iwasaki

(10) Patent No.: US 11,971,147 B2

(45) Date of Patent: Apr. 30, 2024

(54) VEHICLE LIGHT GUIDE AND VEHICLE HEADLIGHT

(71) Applicant: Ichikoh Industries, Ltd., Isehara (JP)

(72) Inventor: Kazunori Iwasaki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 32 days.

(21) Appl. No.: 17/772,839

(22) PCT Filed: Oct. 22, 2020

(86) PCT No.: PCT/JP2020/039708

§ 371 (c)(1),
(2) Date: Apr. 28, 2022

(87) PCT Pub. No.: WO2021/085298

PCT Pub. Date: May 6, 2021

(65) Prior Publication Data

US 2022/0390080 A1 Dec. 8, 2022

(30) Foreign Application Priority Data

Nov. 1, 2019 (JP) ................................ 2019-200078
Nov. 1, 2019 (JP) ................................ 2019-200089

(51) Int. Cl.
*F21S 41/24* (2018.01)
*F21S 41/32* (2018.01)
(Continued)

(52) U.S. Cl.
CPC ............ *F21S 41/24* (2018.01); *F21S 41/322* (2018.01); *F21S 41/43* (2018.01); *F21V 7/0091* (2013.01); *F21W 2102/155* (2018.01); *F21Y 2115/15* (2016.08); *F21Y 2115/30* (2016.08)

(58) Field of Classification Search
CPC .......... F21S 41/24; F21S 41/322; F21S 41/43; F21S 41/40
See application file for complete search history.

(56) References Cited

U.S. PATENT DOCUMENTS

2014/0362596 A1 12/2014 Nakaya
2017/0130923 A1* 5/2017 Nishimura ........... F21S 41/265
(Continued)

FOREIGN PATENT DOCUMENTS

EP 2993392 A1 3/2016
EP 3109542 A1 12/2016
(Continued)

OTHER PUBLICATIONS

International Search Report issued Dec. 15, 2020 in PCT/JP2020/039708 filed on Oct. 22, 2020, 2 pages.
(Continued)

*Primary Examiner* — Colin J Cattanach
(74) *Attorney, Agent, or Firm* — Oblon, McClelland, Maier & Neustadt, L.L.P.

(57) ABSTRACT

A vehicle light guide and a vehicle headlight which can improve long-distance visibility are provided. The vehicle light guide has a shape having an incident surface on which light from a light source is incident, a first reflective surface which internally reflects the light incident from the incident surface toward a front in a front-back direction in a vehicle-mounted state, a second reflective surface having a shape with an inclined portion inclined to a lower side in the front-back direction in the vehicle-mounted state across an edge side on the front in the front-back direction and internally reflecting the light reflected by the first reflective surface toward the front in the front-back direction, and an emission surface that emits the light internally reflected by the first reflective surface and the second reflective surface
(Continued)

and emits a light distribution pattern to the front of the vehicle.

14 Claims, 12 Drawing Sheets

(51) Int. Cl.

| | |
|---|---|
| ***F21S 41/43*** | (2018.01) |
| ***F21V 7/00*** | (2006.01) |
| ***F21W 102/155*** | (2018.01) |
| ***F21Y 115/15*** | (2016.01) |
| ***F21Y 115/30*** | (2016.01) |

(56) References Cited

U.S. PATENT DOCUMENTS

| | | | | |
|---|---|---|---|---|
| 2017/0167681 | A1 | 6/2017 | Owada | |
| 2018/0058651 | A1* | 3/2018 | Gromfeld | F21S 41/25 |

FOREIGN PATENT DOCUMENTS

| | | | |
|---|---|---|---|
| FR | 3010772 | A1 | 3/2015 |
| JP | 2006-302902 | A | 11/2006 |
| JP | 2014-241220 | A | 12/2014 |
| JP | 2017-084556 | A | 5/2017 |
| JP | 2017-112107 | A | 6/2017 |

OTHER PUBLICATIONS

Supplementary Partial European Search Report issued Feb. 27, 2024 in European Patent Application No. 20882560.4, citing references 15-17 therein (13 pgs).

Office Action issued Feb. 21, 2024 in Chinese Patent Application 202080076340.6, and an English translation (14 pgs).

Office Action issued Jul. 4, 2023 in Japanese Patent Application No. 2019-200078, and an English translation (8 pgs).

Office Action issued Jul. 4, 2023 in Japanese Patent Application No. 2019-200089, and an English translation (8 pgs).

* cited by examiner

VEHICLE LIGHT GUIDE AND VEHICLE HEADLIGHT

TECHNICAL FIELD

The present invention relates to a vehicle light guide and a vehicle headlight.

BACKGROUND ART

A so-called direct-emission type vehicle headlight is known, in which light from a light source is caused to be directly incident on an incident surface of a vehicle light guide, to be fully reflected on an inner surface of the vehicle light guide and then, to be emitted from an emission surface so as to form a light distribution pattern having a cutoff line on a front of the vehicle (see, for example, Patent Literature 1).

CITATION LIST

Patent Literature

Patent Literature 1: Japanese Patent Laid-Open No. 2006-302902

SUMMARY OF THE INVENTION

Problems to be Solved by the Invention

However, improvement of long-distance visibility is in demand.

The present invention was made in view of the above and has an object to provide a vehicle light guide and a vehicle headlight which can improve the long-distance visibility.

Means for Solving the Problems

The vehicle light guide of the present invention includes an incident surface on which light from a light source is incident, a first reflective surface that internally reflects the light incident from the incident surface toward a front in a front-back direction in a vehicle-mounted state, a second reflective surface having a shape with an inclined portion inclined to a lower side in an up-down direction in the vehicle-mounted state across an end portion on the front in the front-back direction and internally reflecting the light reflected by the first reflective surface toward the front in the front-back direction, and an emission surface that emits the light internally reflected by the first reflective surface and the second reflective surface and emits a light distribution pattern to the front of the vehicle.

Moreover, the second reflective surface may have a curved portion for forming a cutoff line in the light distribution pattern on an end portion on the front in the front-back direction, and the inclined portion may be disposed at a position corresponding to the curved portion.

Moreover, the inclined portion may be formed so that dimensions in a right-left direction in the vehicle-mounted state become smaller toward a rear in the front-back direction.

Moreover, the second reflective surface may have a step portion in order to form a diagonal cutoff line in the light distribution pattern, and the step portion may extend from the end portion on the front in the front-back direction of the second reflective surface to the rear in the front-back direction in a state inclined to a higher side.

Moreover, the inclined portion may be disposed on a lower side of the second reflective surface where the height is lowered by the step portion.

The vehicle light guide according to the present invention includes an incident surface on which light from a light source is incident, a first reflective surface that internally reflects a part of the light incident from the incident surface toward the front in the front-back direction in the vehicle-mounted state, a second reflective surface that internally reflects the part of light reflected by the first reflective surface toward the front in the front-back direction, a transmission surface which is provided in a stepped state from a rear in the front-back direction of the second reflective surface toward an outer side of the light guide and transmits the part of the light reflected by the first reflective surface to the outer side of the light guide, a re-incident surface provided from the front in the front-back direction of the second reflective surface toward the outer side of the light guide so as to face the transmission surface and causes the light transmitted from the transmission surface to the outer side of the light guide to be re-incident, and an emission surface having a curved surface shape with a focus at a position which coincides or substantially coincides with an end portion on the front in the front-back direction of the second reflective surface, emits the light internally reflected by the first reflective surface and the second reflective surface and the light incident from the re-incident surface and emits a light distribution pattern to the front of the vehicle.

Moreover, the transmission surface may be formed so that light transmitted through the transmission surface travels along the second reflective surface.

Moreover, the transmission surface and the re-incident surface may be perpendicular or substantially perpendicular to the second reflective surface.

Moreover, the transmission surface may have a diffusion portion that diffuses the light in the right-left direction in the vehicle-mounted state.

Moreover, the second reflective surface may have a curved portion with a shape which is curved to a rear side in the front-back direction from both sides in the right-left direction to a center in the vehicle-mounted state on a part of an edge side on a front in the front-back direction, and the re-incident surface may have a shape following the curved portion.

Moreover, the first reflective surface may have a shape based on an ellipsoid surface having a first focus at a position on an optical axis of the light source and on a side opposite to an emission direction of the light, and a second focus at a position which coincides and substantially coincides with the focus of the emission surface.

A vehicle headlight according to the present invention includes a light source and a vehicle light guide which guides light from the light source, emits the light, and emits a light distribution pattern to the front of the vehicle.

Effect of the Invention

According to the present invention, the vehicle light guide and the vehicle headlight which can improve long-distance visibility can be provided.

MODE FOR CARRYING OUT THE INVENTION

First Embodiment

Hereinafter, embodiments of a vehicle light guide and a vehicle headlight according to the present invention will be described with reference to the drawings. Note that the present invention is not limited by the embodiment. Constituent elements in the following embodiment include those that are replaceable and easy to be replaced by those skilled in the art, or those that are substantially identical.

In the following description, the front-back, up-down, and right-left directions indicate directions in a vehicle mounted state in which a vehicle headlight is mounted on a vehicle, and also indicate the directions when seen from a driver's seat in the direction of travel of the vehicle. Note that, in the present embodiment, it is assumed that the up-down direction is parallel to a vertical direction and the right-left direction is a horizontal direction.

Figure 1:
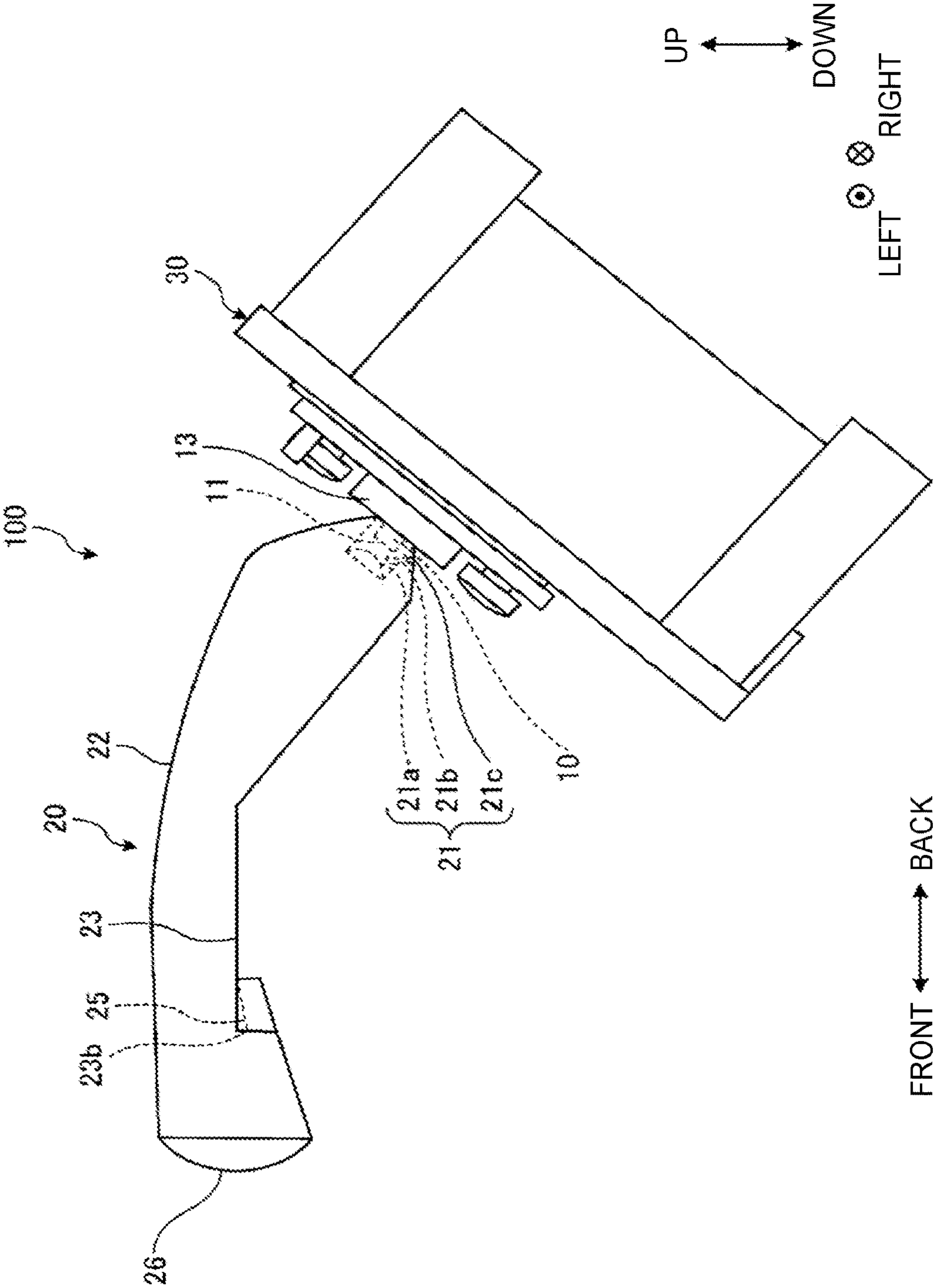
FIG. 1 is a side view illustrating an example of a vehicle headlight.

FIG. 1 is a side view illustrating an example of a vehicle headlight 100. The vehicle headlight 100 shown in FIG. 1 emits a light distribution pattern P (see FIG. 7) described later to the front of the vehicle. In this embodiment, a low-beam pattern, for example, will be described as an example of the light distribution pattern P. The vehicle headlight 100 includes a light source 10 and a vehicle light guide 20. In this embodiment, a configuration of the vehicle headlight 100 mounted on the vehicle that travels on a road of left-hand traffic will be described as an example.

Light Source

For the light source 10, in this embodiment, semiconductor type light sources such as an LED and an OLED (organic EL), laser light sources and the like are used, for example. The light source 10 has a light emitting surface 11 that emits light. The light emitting surface 11 is disposed so as to face an incident surface 21 of the vehicle light guide 20 described later. The light source 10 is mounted on a substrate 13. The substrate 13 is held by a mounting member 30. The mounting member 30 dissipates a heat generated by the light source 10.

Vehicle Light Guide

Figure 2:
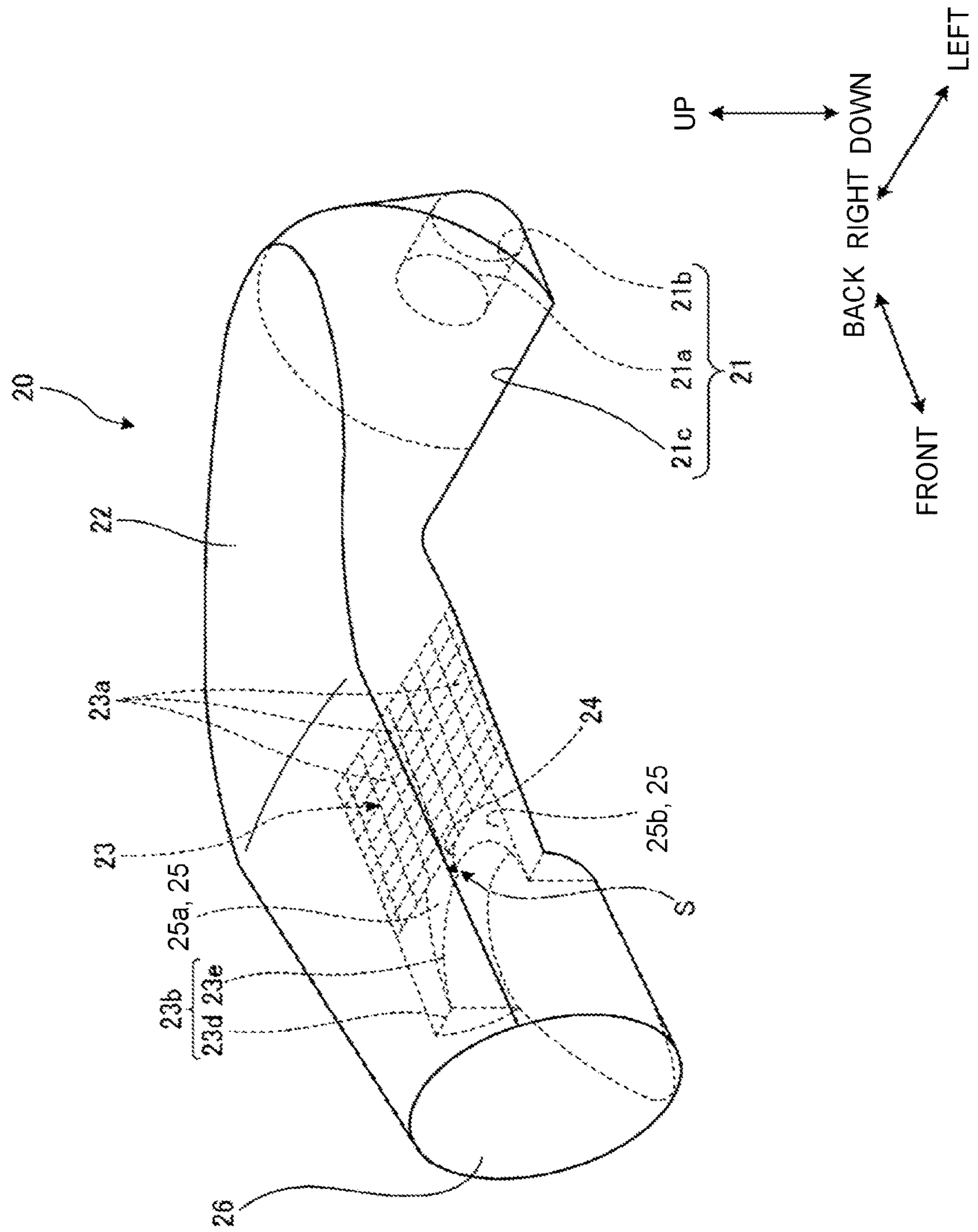
FIG. 2 is a perspective view illustrating an example of the vehicle light guide.
Figure 3:
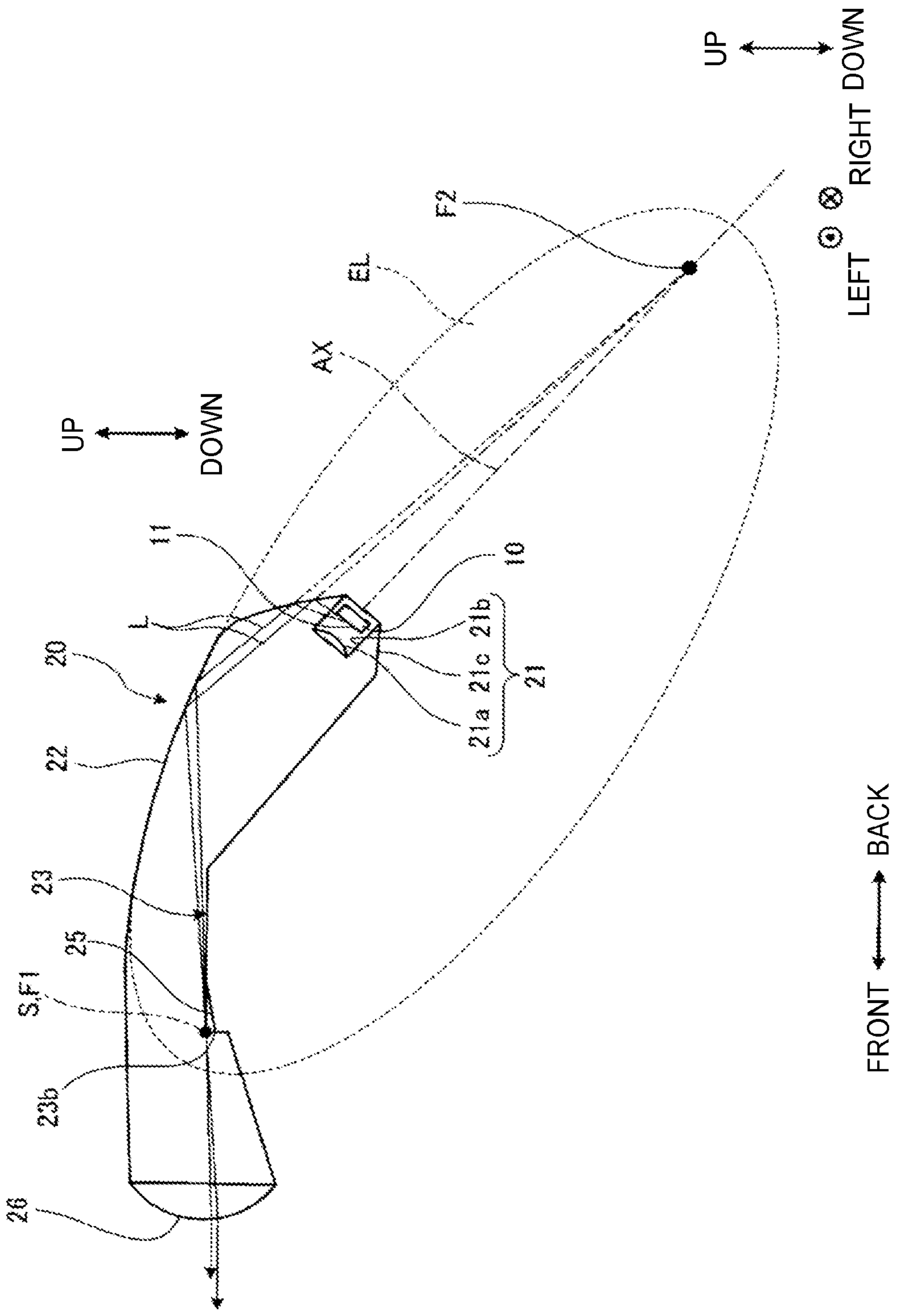
FIG. 3 is a sectional view illustrating an example of the vehicle light guide.

FIG. 2 is a perspective view illustrating an example of the vehicle light guide 20. FIG. 3 is a sectional view illustrating an example of the vehicle light guide 20. Note that, FIG. 2 is depicted such that the configuration of a back side of the vehicle light guide 20 in a sight-line direction is seen through. Moreover, FIG. 3 shows a section cut by a plane passing through the optical axis of the light source 10 and perpendicular to the light emitting surface 11.

The vehicle light guide 20 shown in FIGS. 2 and 3 guides light from the light source 10 and emits the light toward the front in the vehicle mounted state. The vehicle light guide 20 according to this embodiment has a configuration in which functions corresponding to each of a reflector, a shade, a projection lens and the like in a conventional projector-type vehicle headlight, for example, are integrated. The vehicle light guide 20 includes the incident surface 21, a first reflective surface 22, a second reflective surface 23, and an emission surface 26.

Incident Surface

The incident surface 21 is provided correspondingly to the light source 10. The incident surface 21 is formed having a truncated conical shape, for example. The incident surface 21 has a first surface 21*a*, a second surface 21*b*, and an incident-side reflective surface 21*c*. Light from the light source 10 is incident on the first surface 21*a* and the second surface 21*b*. The first surface 21*a* faces the light emitting surface 11. The first surface 21*a* is a flat surface or a convex surface projecting toward the light source 10 side. The second surface 21*b* is disposed on a side of the light source 10 and is disposed in a state of a cylindrical surface so as to surround the light emitting surface 11 and the first surface 21*a* of the light source 10. The incident-side reflective surface 21*c* reflects the light incident from the second surface 21*b* toward the first reflective surface 22.

First Reflective Surface

The first reflective surface 22 internally reflects the light incident from the incident surface 21 toward the front. In this embodiment, the first reflective surface 22 reflects the light incident from the incident surface 21 toward a predetermined focal position S. The focal position S is set at a position which coincides or substantially coincides with the focus of the emission surface 26, which will be described later. The first reflective surface 22 has a shape based on an ellipsoid surface EL having a first focus F1 at a position on the optical axis of the light source 10 and on a side opposite to the light emission direction, for example, and a second focus F2 at a position which coincides and substantially coincides with the focal position S. Note that the first reflective surface 22 is not limited to a free-form surface based on the ellipsoid surface EL as described above, but may also be based on other curved surfaces, such as a free-form surface based on a parabolic surface, for example. The first reflective surface 22 is disposed on the upper side in the vehicle-mounted state.

Second Reflective Surface

The second reflective surface 23 has a planar-based shape. The second reflective surface 23 internally reflects a part of the light reflected by the first reflective surface 22 toward the front (emission surface 26). The second reflective surface 23 is disposed along a horizontal plane in the vehicle mounted state. The second reflective surface 23 is disposed on a side vertically opposite to the first reflective surface 22 in the vehicle light guide 20. In other words, in this embodiment, the second reflective surface 23 is disposed on a lower side in the vehicle mounted state.

The second reflective surface 23 has a prism portion 23*a* and an edge side 23*b*. The edge side 23*b* is provided on an end portion on a front of the second reflective surface 23. The edge side 23*b* has a linear portion 23*d* and a curved portion 23*e*. The linear portion 23*d* is provided on both ends in the right-left direction, respectively. The curved portion 23*e* is the portion which is curved backward to a center from the linear portions 23*d* on both sides in the right-left direction.

Figure 4:
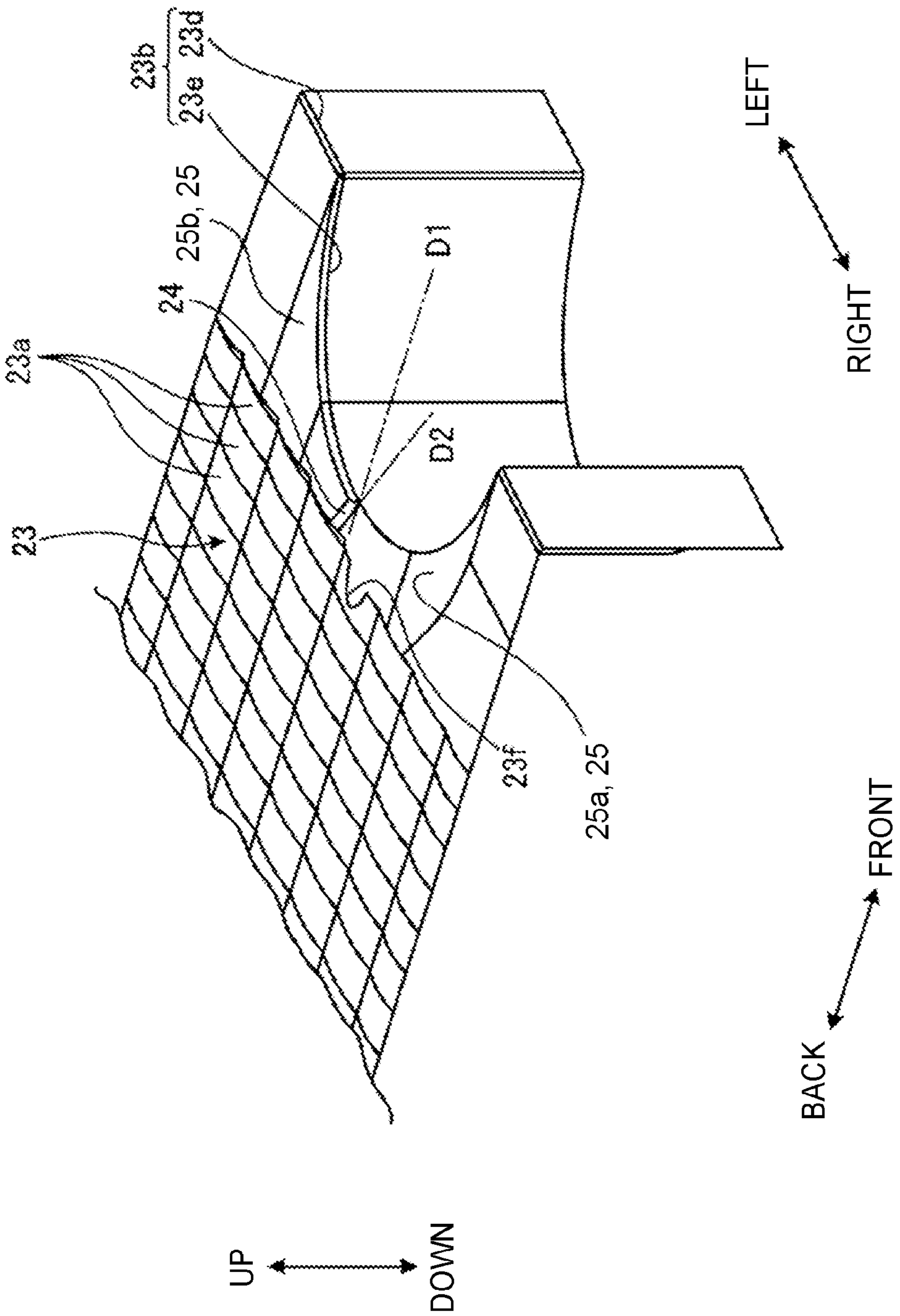
FIG. 4 is a view illustrating an example of a second reflective surface.

FIG. 4 is a diagram illustrating an example of the second reflective surface 23. FIG. 4 shows a state where the second reflective surface 23 is seen from the front and inside of the vehicle light guide 20. As shown in FIG. 4, the prism portions 23*a* are aligned in plural in the front-back and right-left directions of the second reflective surface 23, for example. The prism portion 23*a* diffuses the light having reached the second reflective surface 23.

In this embodiment, the prism portions 23*a* are provided across the entire right-left direction of the second reflective surface 23, but it is not limiting. The prism portions 23*a* may be provided on a part in the right-left direction of the second reflective surface 23. Moreover, it is configured that the prism portion 23*a* is not provided in areas of the second reflective surface 23 at both ends in the right-left direction and on the front side in the front-back direction, but it is not limiting. The prism portions 23*a* may be provided also on each of these areas. Shapes and dimensions of the plurality of prism portions 23*a* may be different from each other in the front-back direction, the right-left direction, and the up-down direction.

The curved portion 23*e* is disposed so that a center part in the right-left direction coincides or substantially coincides with the focal position S of the emission surface 26, which will be described later. The curved portion 23*e* forms a cutoff line CL (see FIG. 7). On the curved portion 23*e*, a step portion 24 is provided.

The step portion 24 forms a diagonal cutoff line CLa (see FIG. 7) in the light distribution pattern P. In the step portion 24, an inclination direction is set in accordance with inclination of the diagonal cutoff line CLa. The step portion 24 is inclined diagonally upward from right to left in the right-left direction. The left side of the step portion 24 is higher in the up-down direction than the right side of the step portion 24.

The step portion 24 extends from the curved portion 23*e* of the edge side 23*b* in the second reflective surface 23 to a rear in a state inclined in the right-left direction. Thus, as shown in FIG. 4, for example, a direction D2 in which the step portion 24 extends is in a state inclined in the right-left direction with respect to a front-back direction D1. In this case, the step portion 24 extends toward the rear in the inclined state toward a higher side in the up-down direction than the step portion 24 in the right-left direction. In this embodiment, the step portion 24 is higher in the up-down direction from the right side to the left side. Thus, the step portion 24 extends backward in a state inclined to the right-left direction. In this case, a stepped surface of the step portion 24 is in a state facing the right in the right-left direction, backward in the front-back direction, and upward in the vertical direction.

The second reflective surface 23 has an inclined portion 25. The inclined portion 25 is the portion inclined downward toward the front in the second reflective surface 23. The inclined portion 25 is a planar shape, for example, but it is not limiting and may be curved. Moreover, the inclined portion 25 may be formed so that an inclination angle varies in steps. Compared to the other parts of the second reflective surface 23, the inclined portion 25 is formed such that reflective light from the inclined portion 25 passes a position close to the edge side 23*b* which forms the cutoff line in the vertical direction.

The inclined portion 25 is provided on the front side with respect to a region where the prism portion 23*a* in the second reflective surface 23 is provided. The inclined portion 25 is disposed at a position corresponding to the curved portion 23*e* with respect to the right-left direction. The inclined portion 25 is divided in the right-left direction by the step portion 24. In other words, the inclined portion 25 has a low-side inclined portion 25*a* on the right side with respect to the step portion 24 and a high-side inclined portion 25*b* on the left side with respect to the step portion 24. The inclined portion 25 can have the same inclination angle with respect to the other parts, for example, between the low-side inclined portion 25*a* and the high-side inclined portion 25*b*. The inclined portion 25 may have different inclined angles between the low-side inclined portion 25*a* and the high-side inclined portion 25*b*. For example, the high-side inclined portion 25*b* does not have to be provided. In other words, the region corresponding to the high-side inclined portion 25*b*, similarly to the region where the prism portion 23*a* is provided, may be in a state along the horizontal plane. In this case, the inclined portion 25 is disposed on the lower side of the second reflective surface 23, where a height is lowered by the step portion 24, that is, it is disposed in the region corresponding to the low-side inclined portion 25*a*.

In the plurality of prism portions 23*a*, in some of the prism portions 23*a* disposed at the front end portion, for example, a notch portion 23*f* is provided. The notch portion 23*f* prevents a part of the light reflected by the second reflective surface 22 and traveling toward the emission surface 26 side from being shielded by the prism portion 23*a*. As a result, generation of shadows on the diagonal cutoff line of the light distribution pattern P can be prevented. Moreover, the notch portion 23*f* also allows more light to reach the inclined portion 25 in front of the notch portion 23*f* (in this embodiment, the low-side inclined portion 25*a*).

The inclined portion 25 is formed so that dimensions in the right-left direction become smaller toward the rear. In this embodiment, the inclined portion 25 is formed so that the dimensions in the right-left direction become narrower to the center side toward the rear. In this embodiment, the inclined portion 25 is formed so that the right side in the right-left direction, that is, the right side of the low-side inclined portion 25*a* is curved toward the center. The left side of the high-side inclined portion 25*b* of the inclined portion 25 is formed along the front-back direction.

Emission Surface

The emission surface 26 emits the light internally reflected by the first reflective surface 22 and the second reflective surface 23 and emits the light distribution pattern P (FIG. 7) toward the front of the vehicle. The emission surface 26 is formed having a curved surface shape so as to have a focus at a position which coincides or substantially coincides with the focal position S.

Operation

Figure 5:
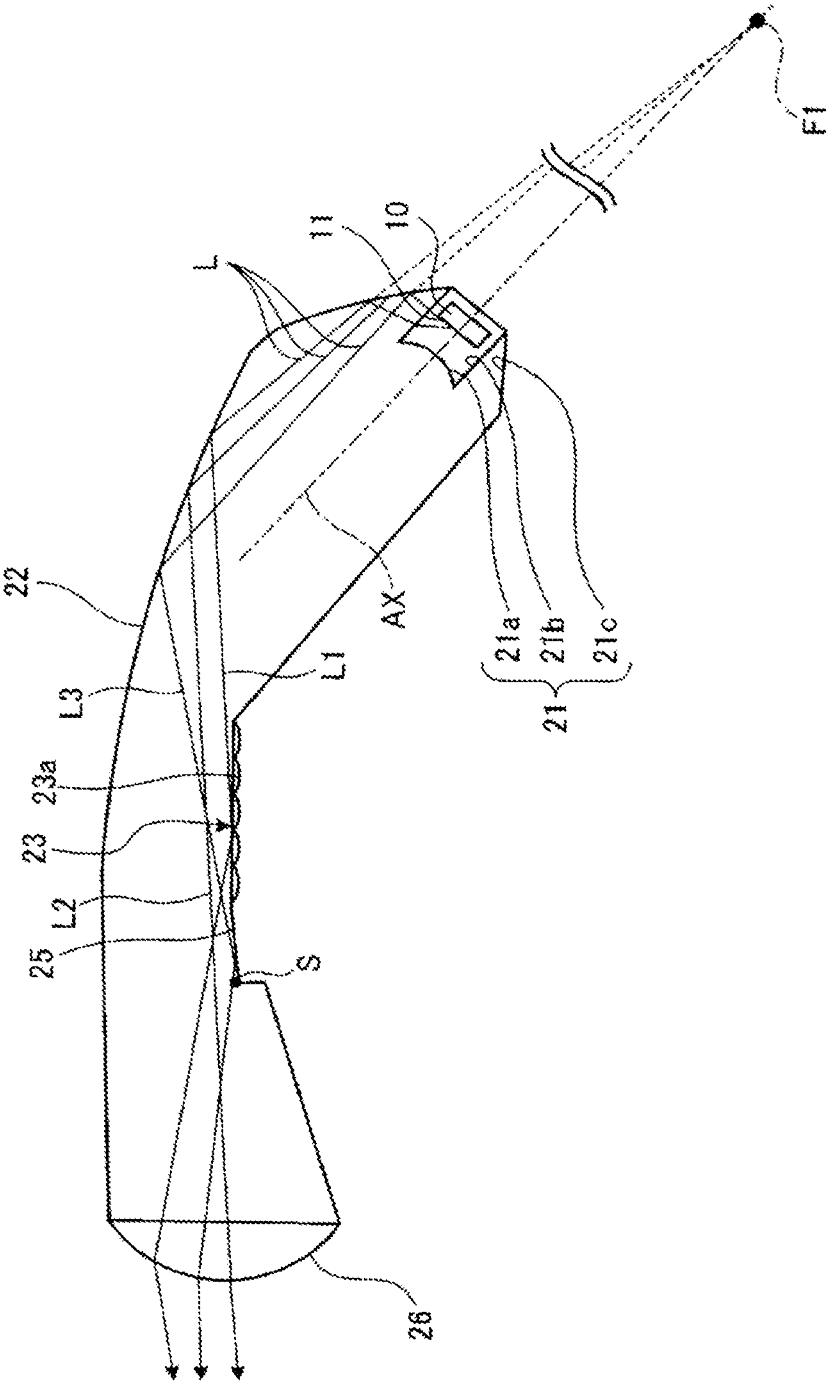
FIG. 5 is a view illustrating an example of an optical path of light incident on the vehicle light guide.
Figure 6:
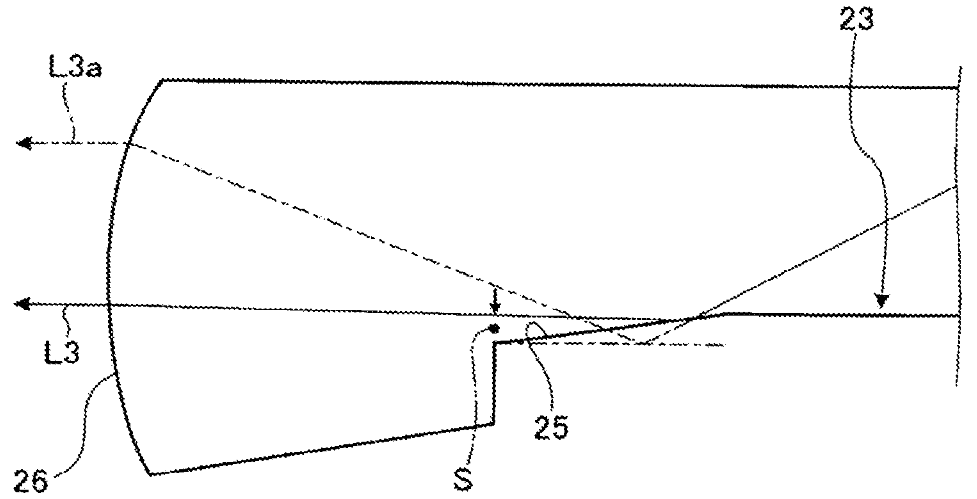
FIG. 6 is a view illustrating an example of the optical path of the light reflected by the inclined portion of the second reflective surface.
Figure 7:
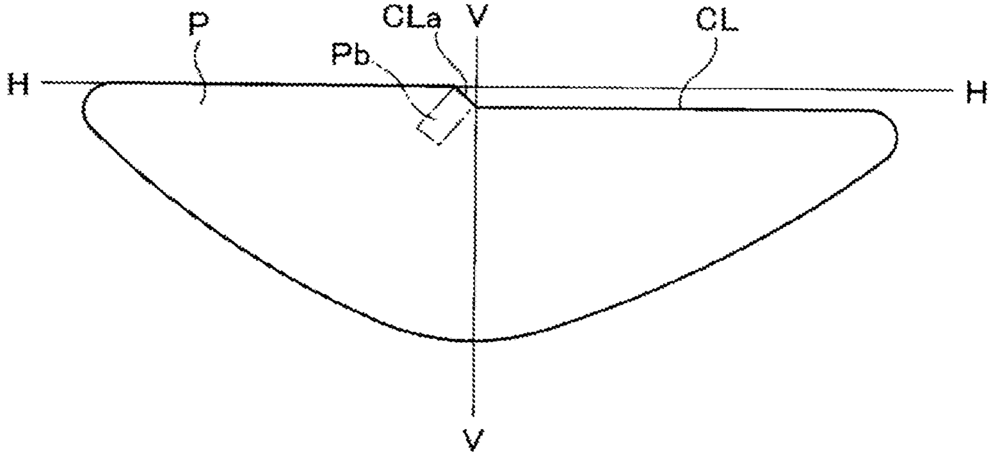
FIG. 7 is a diagram illustrating an example of a light distribution pattern emitted to a virtual screen in front of the vehicle.

Subsequently, an operation of the vehicle headlight 100 configured as above will be described. FIG. 5 is a diagram illustrating an example of the optical path of the light incident on the vehicle light guide 20. FIG. 6 is a diagram illustrating an example of the optical path of the light reflected by the inclined portion 25 of the second reflective surface 23. FIG. 7 is a diagram illustrating an example of the light distribution pattern P emitted on a virtual screen in front of a vehicle and illustrates the pattern corresponding to the vehicle traveling on the right side of the road. In FIG. 7, a V-V line indicates a vertical line of the screen and an H-H line indicates a right-left horizontal line on the screen. Herein, an intersection between the vertical line and the horizontal line is assumed to be a reference position in the horizontal direction.

By turning on the light source 10 of the vehicle headlight 100, light is emitted from the light emitting surface 11. This light L is incident from the first surface 21*a* and the second surface 21*b* of the incident surface 21 to the vehicle light guide 20. The light L incident from the first surface 21*a* travels toward the first reflective surface 22 side. The light L incident from the second surface 21*b* is internally reflected by the incident-side reflective surface 21*c* toward the first reflective surface 22 side. The light L having reached the first reflective surface 22 is internally reflected on the first reflective surface 22 toward the second reflective surface 23.

Light L1, which is a part of the light L internally reflected by the first reflective surface 22, reaches the prism portion 23*a* in the second reflective surface 23. In FIG. 5, the configuration of the prism portion 23*a* is shown schematically. The light L1 having reached the prism portion 23*a* is internally reflected so as to be diffused by the prism portion 23*a* and reaches the emission surface 26. Moreover, light L2, which is a part of the light L, reaches the emission surface 26 beyond the second reflective surface 23.

In addition, light L3, which is a part of the light L, reaches the inclined portion 25 of the second reflective surface 23. The light L3 having reached the inclined portion 25 is internally reflected by the inclined portion 25 and reaches the emission surface 26. As shown in FIG. 6, in this embodiment, the inclined portion 25 is inclined downward from rear to front. Therefore, the light L3 is reflected more to the lower side, that is, closer to the focal position S by the internal reflection in the inclined portion 25 than a case where the inclined portion 25 is not provided (indicated by a sign L3*a*) and reaches the emission surface 26.

The light L1 to the light L3 emitted from the emission surface 26 are emitted to the front of the vehicle as the light distribution pattern P having the cutoff line CL as shown in FIG. 7. In FIG. 7, a state where the diagonal cutoff line CLa in the cutoff line CL is formed so as to be inclined downward toward the right side is described as an example, but this is not limiting, and the similar explanation can be given also for a case where the diagonal cutoff line is inclined downward toward the left side.

In the embodiment, the inclined portion 25 is inclined downward from rear to front. Therefore, the light L3 reflected by the inclined portion 25 passes a position close to the edge side 23*b* which forms the cutoff line CL in the vertical direction and thus, when emitted from the emission surface 26, it can be emitted to the position closer to the cutoff line CL. Therefore, the long-distance visibility is improved as compared with a case where the inclined portion 25 is not provided.

On the other hand, the light L reaching the step portion 24 of the second reflective surface 23 is reflected by the step portion 24 but does not reach the emission surface 26. Therefore, as the light distribution pattern P, a projected image in a state where the light reflected on the step portion 24 is deficient is formed. Here, when the step portion 24 extends to the rear from the curved portion 23*e* along the front-back direction, the reflective light from the second reflective surface 23 provided on the right and left sides with the step portion 24 therebetween is emitted from the emission surface 26. In other words, when viewed from the emission surface 26 side, the step portion 24 at a center part in the right-left direction of the second reflective surface 23 is seen as a dark area. This causes deficiency in the light distribution pattern P by the light L from the emission surface 26. Specifically, since a shape of a front end portion of the step portion 24 forms the diagonal cutoff line CLa, as shown in FIG. 7, it is seen as a defective area (shadow) Pb in a region including the diagonal cutoff line CLa. On the other hand, in this embodiment, the step portion 24 extends to the rear and in a state inclined to the higher side from the curved portion 23*e*. In this configuration, the step portion 24 is disposed at a position where it is difficult to be seen when viewed from the emission surface 26 side, so the step portion 24 is hardly seen as the dark area in the center part in the right-left direction of the second reflective surface 23. As a result, deficiency is suppressed also in the light distribution pattern P by the light L from the emission surface 26.

As described above, the vehicle light guide 20 according to the present invention includes the incident surface 21 on which the light from the light source 10 is incident, the first reflective surface 22 that internally reflects the light incident from the incident surface 21 toward the front in the front-back direction in the vehicle-mounted state, the second reflective surface 23 having a shape with the inclined portion 25 inclined to the lower side in the front-back direction in the vehicle-mounted state across the edge side 23*b* on the front in the front-back direction and internally reflecting the light reflected by the first reflective surface 22 toward the front in the front-back direction, and the emission surface 26 that emits the light internally reflected by the first reflective surface 22 and the second reflective surface 23 and emits the light distribution pattern to the front of the vehicle.

According to this configuration, the light having reached the inclined portion 25 is reflected more downward, that is, closer to the focal position S by the internal reflection in the inclined portion 25 than the case where the inclined portion 25 is not provided and reaches the emission surface 26. Thus, when this light is emitted from the emission surface 26, it can be emitted to a position closer to the cutoff line CL. Therefore, the long-distance visibility is improved as compared with the case where the inclined portion 25 is not provided.

In the vehicle light guide 20 according to this embodiment, the second reflective surface 23 has a curved portion 23*e* for forming the cutoff line CL in the light distribution pattern P on the edge side 23*b* on the front in the front-back direction, and the inclined portion 25 is disposed at a position corresponding to the curved portion 23*e*. As a result, more light can be emitted to the position close to the cutoff line CL.

In the vehicle light guide 20 according to this embodiment, the inclined portion 25 is formed so that the dimensions in the right-left direction in the vehicle mounted state become smaller toward the rear in the front-back direction. As a result, the light amount to be emitted to the position close to the cutoff line CL can be adjusted.

In the vehicle light guide 20 according to this embodiment, the second reflective surface 23 has the step portion 24 for forming the diagonal cutoff line CLa in the light distribution pattern, and the step portion 24 extends from the edge side 23*b* on the front in the front-back direction of the second reflective surface 23 to the rear in the front-back direction in a state inclined to the higher side. In this configuration, the step portion 24 is disposed at a position where it is difficult to be seen when viewed from the emission surface 26 side, so the step portion 24 is hardly seen as the dark area in the center part in the right-left direction of the second reflective surface 23. As a result, deficiency is suppressed also in the light distribution pattern P by the light L from the emission surface 26.

In the vehicle light guide 20 according to this embodiment, the inclined portion 25 may be disposed on the lower side (low-side inclined portion 25*a*) in the second reflective surface 23 where the height is lowered by the step portion 24. In this case, more light can be emitted to the side where the light distribution pattern P is pushed up by the diagonal cutoff line CLa, that is, to a position closer to the cutoff line CL on the side of the own lane. Thus, the long-distance visibility on the own lane side can be improved.

In the vehicle light guide 20 according to this embodiment, the first reflective surface 22 has a shape based on the ellipsoid surface EL having the first focus F1 at a position on the optical axis AX of the light source 10 and on the side opposite to the light emission direction, and the second focus F2 at a position which coincides and substantially coincides with the focal position S. In this configuration, when the light emitted from the light source 10 and traveling toward the first reflective surface 22 is traced in an opposite direction, it is virtually focused at a position of the first focus F1. Therefore, the light emitted from the light source 10 goes toward the first reflective surface 22 on the optical path as if it were the light emitted at the first focus F1. As a result, since conventionally developed design arts can be applied to the configuration of the first reflective surface 22, the design can be performed efficiently.

The vehicle headlight 100 according to this embodiment includes the light source 10 and the vehicle light guide 20 which guides light from the light source 10, emits the light, and emits the light distribution pattern P to the front of the vehicle. According to this configuration, the vehicle headlight 100 that can improve long-distance visibility can be provided.

The technical scope of the present invention is not limited to the above embodiment, and changes may be made as appropriate within a range without departing from the spirit of the present invention. For example, in the above embodiment, the configuration in which the inclined portion 25 is disposed at a position corresponding to the curved portion 23*e* is described as an example, but it is not limiting. The inclined portion 25 may be disposed at a position different from the position corresponding to the curved portion 23*e*.

Moreover, in the above embodiment, the configuration in which the inclined portion 25 is formed so that the dimensions in the right-left direction become smaller toward the rear is described as an example, but it is not limiting. The inclined portion 25 may be configured with equal dimensions in the right-left direction toward the rear, or it may be configured such that the dimensions in the right-left direction become larger toward the rear.

Moreover, in the above embodiment, the configuration in which the second reflective surface 23 has the step portion 24, and the step portion 24 extends to the rear from the edge side 23*b* on the front of the second reflective surface 23 in a state inclined to the higher side is described as an example, but it is not limiting. It may be so configured that the step portion 24 extends along the front-back direction toward the rear from the edge side 23*b* on the front of the second reflective surface 23.

Moreover, in the above embodiment, the case in which the first reflective surface 22 has the shape based on the ellipsoid surface EL having the first focus F1 at the position on the optical axis AX of the light source 10 and on the side opposite to the light emission direction and the second focus F2 at the position which coincides and substantially coincides with the focal position S is described as an example, but it is not limiting, and other shapes may be used.

Moreover, in the above embodiment, in the vehicle headlight 100, the configuration in which the light source 10 is disposed at a lower part of the vehicle light guide 20, and the vehicle light guide 20 guides the light diagonally upward is described as an example, but it is not limiting. For example, the vehicle headlight may be configured such that the light source is disposed on an upper part of the vehicle light guide, and the vehicle light guide 20 guides the light diagonally downward. In other words, the configuration may be inverted in the up-down direction with respect to the configuration of the above embodiment. Moreover, the vehicle headlight may be configured to be inclined around an axis with the front-back direction as the center axis with respect to the above configuration.

Second Embodiment

In a conventional vehicle headlight, the vehicle light guide is optically designed by assuming that the light from a point light source is controlled. However, since the actual light source is not a point light source but a planar light source, there is uncontrolled loss of light, which causes light utilization efficiency to be lowered. Therefore, improvement of the light utilization efficiency is in demand.

A second embodiment of the present invention is intended to improve the light utilization efficiency.

Figure 8:
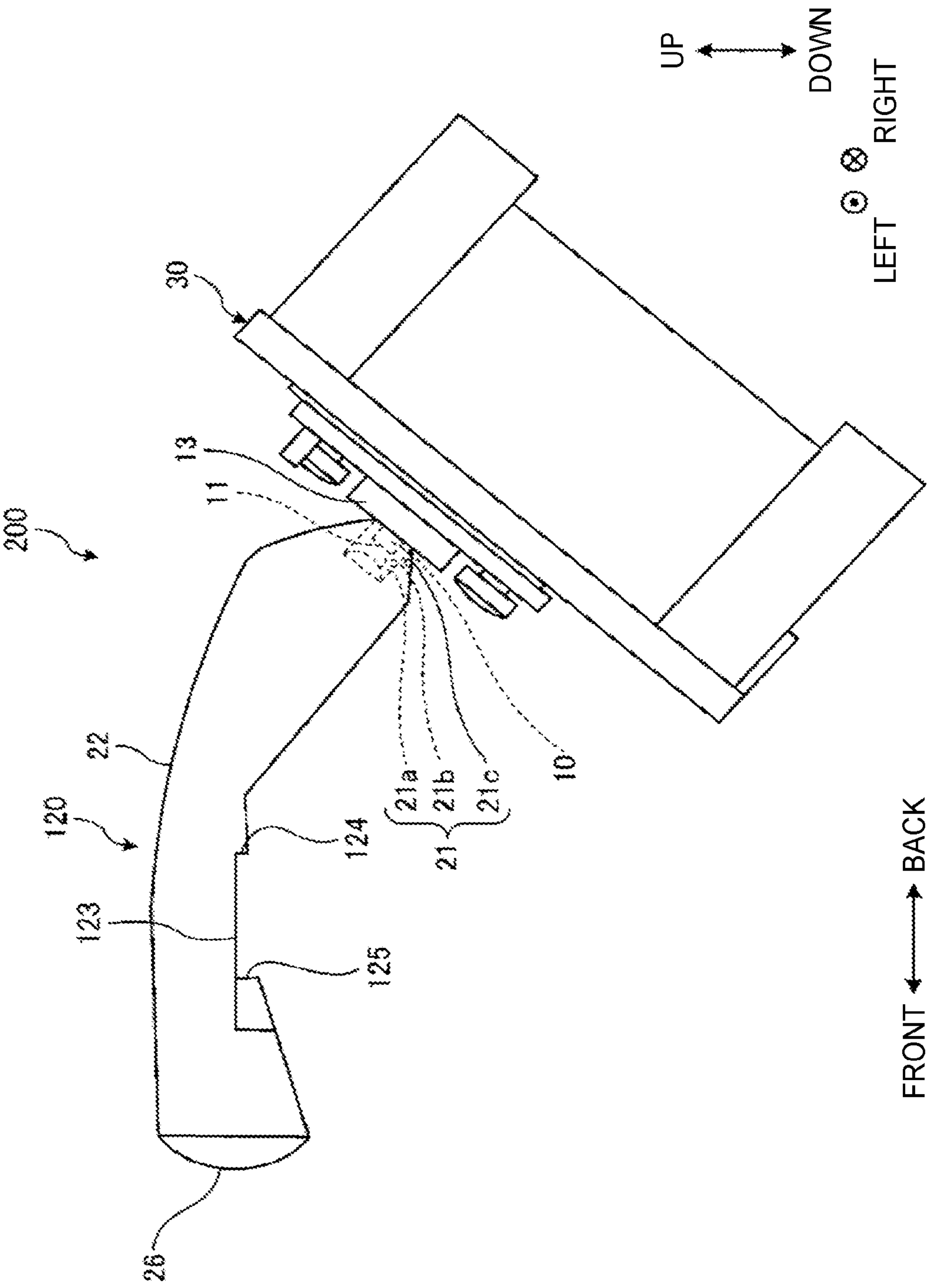
FIG. 8 is a side view illustrating an example of a vehicle headlight.

FIG. 8 is a side view illustrating an example of a vehicle headlight 200. The vehicle headlight 200 shown in FIG. 8 emits the light distribution pattern P (see FIG. 13), which will be described later, to the front of the vehicle. In this embodiment, a low-beam pattern P1 (see FIG. 13) and an overhead pattern P2 (see FIG. 13) are described as the light distribution pattern P as examples. The vehicle headlight 200 includes the light source 10 and a vehicle light guide 120. In this embodiment, a configuration of the vehicle headlight 200 mounted on the vehicle that travels on a road of the left-hand traffic will be described as an example.

Light Source

For the light source 10, in this embodiment, semiconductor type light sources such as an LED and an OLED (organic EL), laser light sources and the like are used, for example. The light source 10 has a light emitting surface 11 that emits light. The light emitting surface 11 is disposed so as to face the incident surface 21 of the vehicle light guide 120 described later. The light source 10 is mounted on a substrate 13. The substrate 13 is held by a mounting member 30. The mounting member 30 dissipates a heat generated by the light source 10.

Vehicle Light Guide

Figure 9:
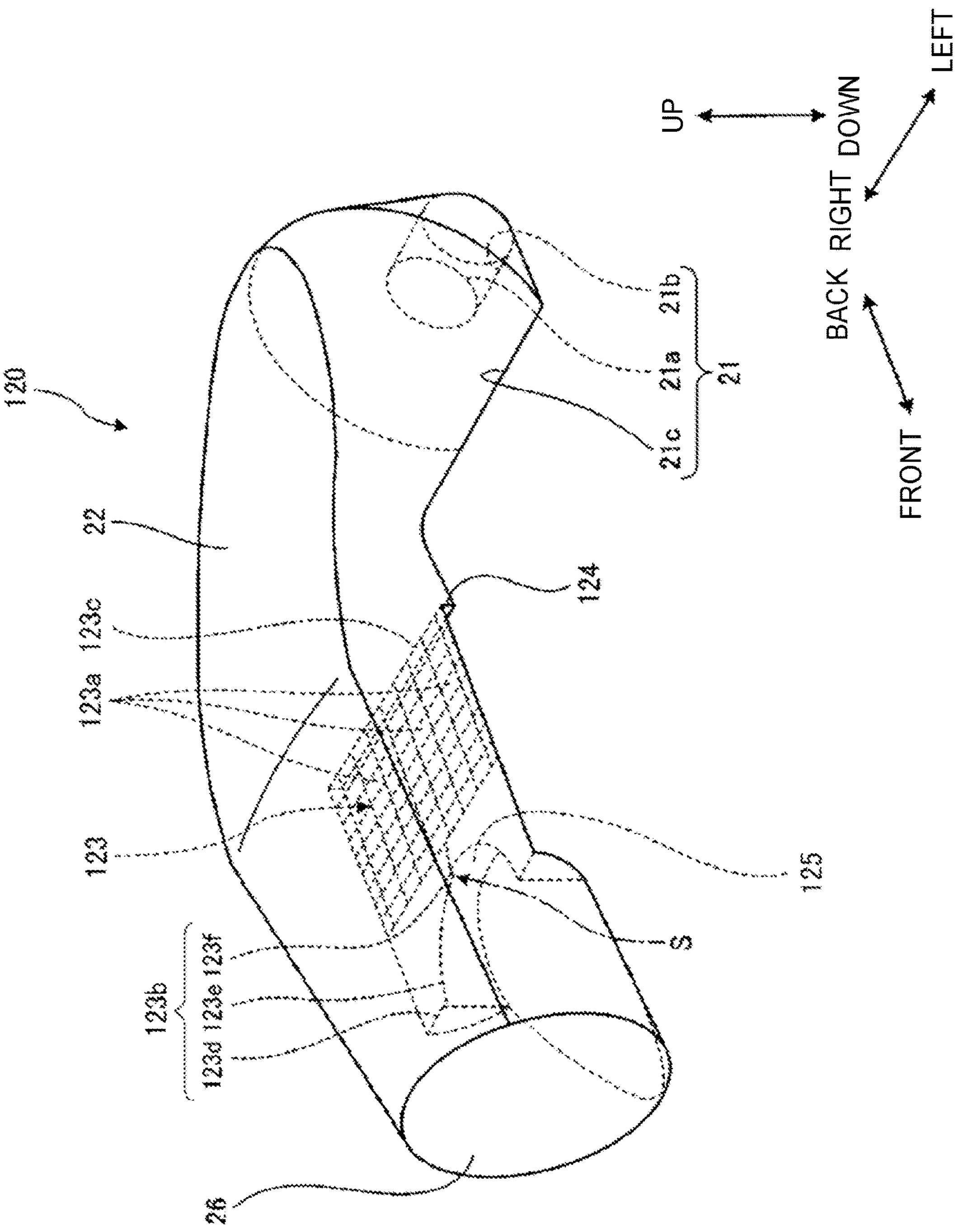
FIG. 9 is a perspective view illustrating an example of the vehicle light guide.
Figure 10:
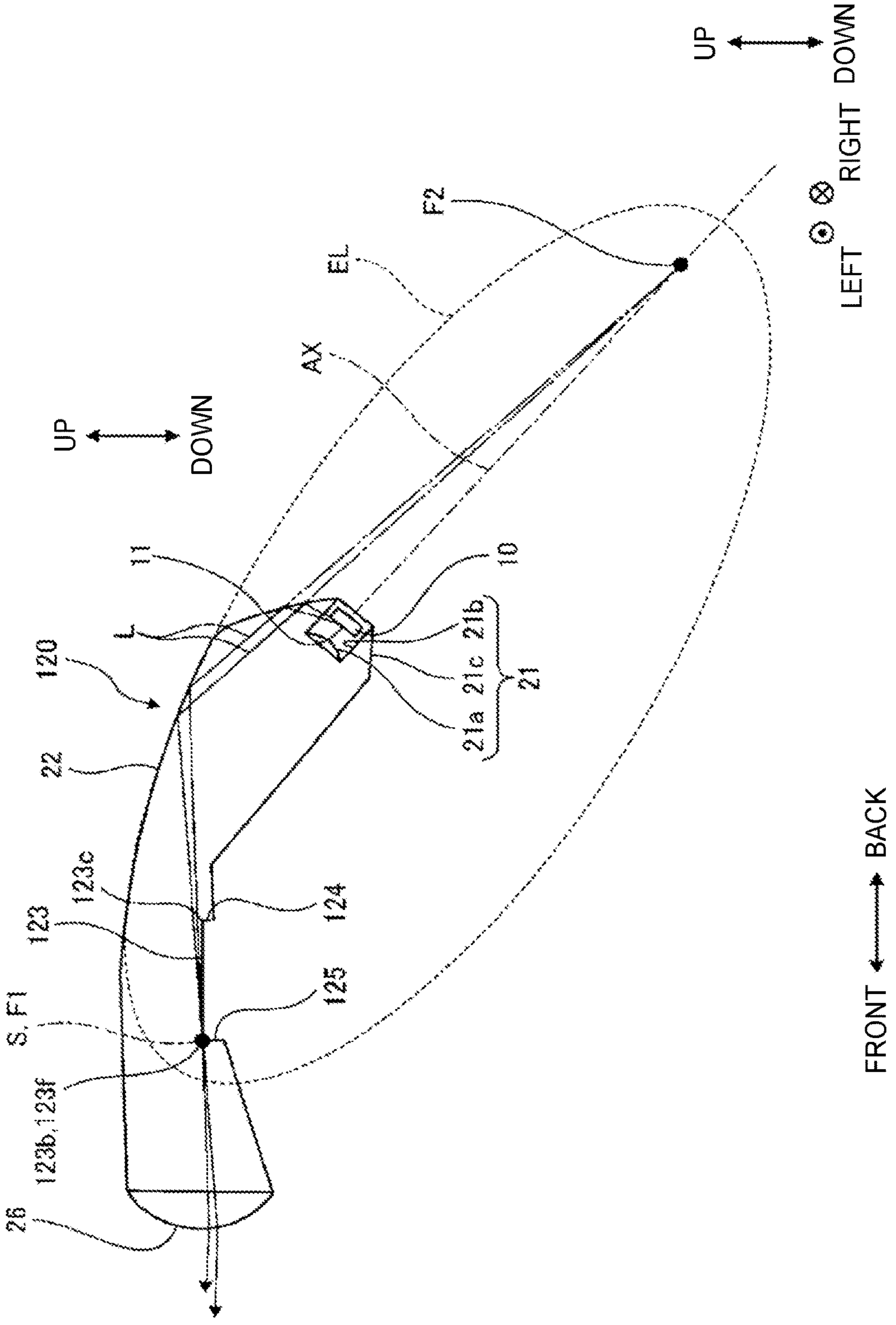
FIG. 10 is a sectional view illustrating an example of the vehicle light guide.

FIG. 9 is a perspective view illustrating an example of the vehicle light guide 120. FIG. 10 is a sectional view illustrating an example of the vehicle light guide 120. Note that, FIG. 9 is depicted such that the configuration of a back side of the vehicle light guide 120 in a sight-line direction is seen through. Moreover, FIG. 10 shows a section cut by a plane passing through the optical axis of the light source 10 and perpendicular to the light emitting surface 11.

The vehicle light guide 120 shown in FIGS. 9 and 10 guides the light from the light source 10 and emits it to the front of the vehicle in the vehicle-mounted state. The vehicle light guide 120 according to this embodiment has a configuration in which functions corresponding to each of a reflector, a shade, a projection lens and the like in a conventional projector-type vehicle headlight, for example, are integrated. The vehicle light guide 120 includes the incident surface 21, the first reflective surface 22, a second reflective surface 123, a transmission surface 124, a re-incident surface 125, and the emission surface 26.

Incident Surface

The incident surface 21 is provided correspondingly to the light source 10. The incident surface 21 is formed having a truncated conical shape, for example. The incident surface 21 has a first surface 21*a*, a second surface 21*b*, and an incident-side reflective surface 21*c*. Light from the light source 10 is incident on the first surface 21*a* and the second surface 21*b*. The first surface 21*a* faces the light emitting surface 11. The first surface 21*a* is a flat surface or a convex surface projecting toward the light source 10 side. The second surface 21*b* is disposed on a side of the light source 10 and is disposed in a state of a cylindrical surface so as to surround the light emitting surface 11 and the first surface 21*a* of the light source 10. The incident-side reflective surface 21*c* reflects the light incident from the second surface 21*b* toward the first reflective surface 22.

First Reflective Surface

The first reflective surface 22 internally reflects the light incident from the incident surface 21 toward the front. In this embodiment, the first reflective surface 22 reflects the light incident from the incident surface 21 toward a predetermined focal position S. The focal position S is set at a position which coincides or substantially coincides with the focus of the emission surface 26, which will be described later. The first reflective surface 22 has a shape based on an ellipsoid surface EL having a first focus F1 at a position on the optical axis of the light source 10 and on a side opposite to the light emission direction, for example, and a second focus F2 at a position which coincides and substantially coincides with the focal position S. Note that the first reflective surface 22 is not limited to a free-form surface based on the ellipsoid surface EL as described above, but may also be based on other curved surfaces, such as a free-form surface based on a parabolic surface, for example. The first reflective surface 22 is disposed on the upper side in the vehicle-mounted state.

Second Reflective Surface

The second reflective surface 123 has a planar-based shape. The second reflective surface 123 internally reflects a part of the light reflected by the first reflective surface 22 toward the front (emission surface 26). The second reflective surface 123 is disposed along a horizontal plane in the vehicle-mounted state. The second reflective surface 123 is disposed on a side vertically opposite to the first reflective surface 22 in the vehicle light guide 120. In other words, in this embodiment, the second reflective surface 123 is disposed on a lower side in the vehicle-mounted state.

The second reflective surface 123 has a prism portion 123*a*, an edge side 123*b*, and an edge side 123*c*. The edge side 123*b* is provided on an end portion on a front of the second reflective surface 123. The edge side 123*b* has a linear portion 123*d* and a curved portion 123*e*. The linear portion 123*d* is provided on both ends in the right-left direction, respectively. The curved portion 123*e* is the portion which is curved backward to a center from the linear portions 123*d* on both sides in the right-left direction.

Figure 11:
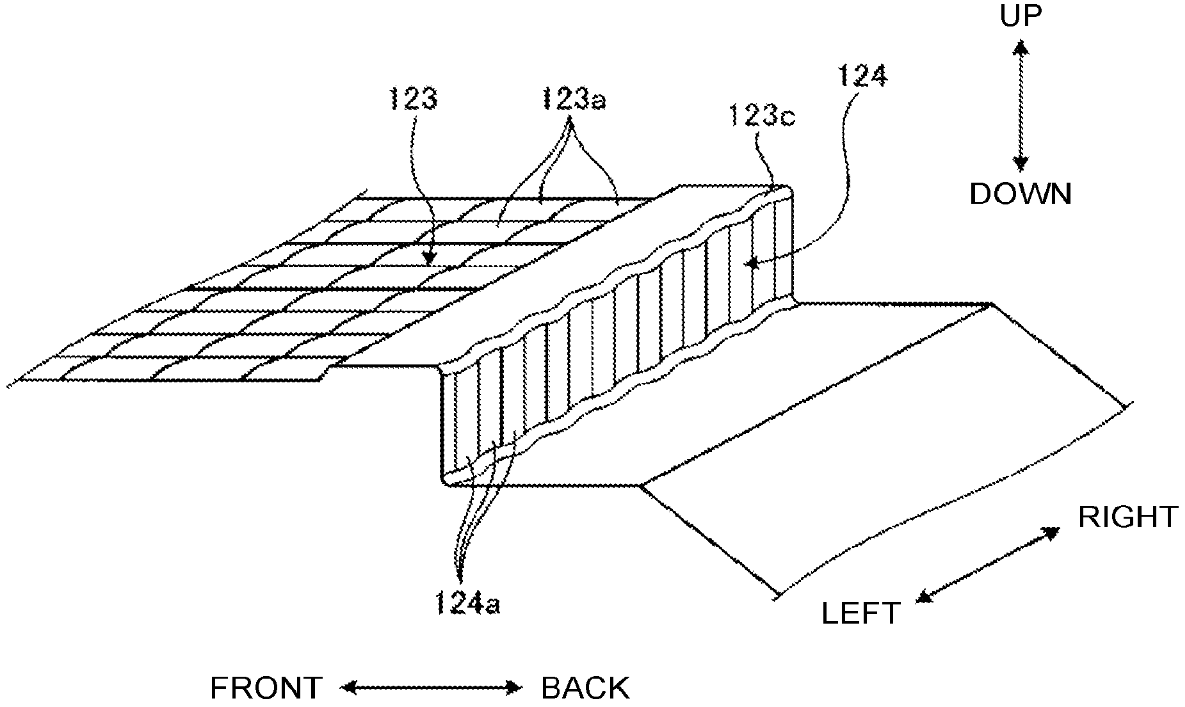
FIG. 11 is a diagram illustrating an example of the second reflective surface and the transmission surface.

FIG. 11 is a diagram illustrating an example of the second reflective surface 123 and the transmission surface 124. FIG. 11 shows a state where the second reflective surface 123 and the transmission surface 124 are seen from the inside of the vehicle light guide 120. As shown in FIG. 11, the prism portions 123*a* are aligned in plural in the front-back and right-left directions of the second reflective surface 123, for example. The prism portion 123*a* diffuses the light having reached the second reflective surface 123.

In this embodiment, the prism portions 123*a* are provided across the entire right-left direction of the second reflective surface 123, but it is not limiting. The prism portions 123*a* may be provided on a part in the right-left direction of the second reflective surface 123. Moreover, it is configured that the prism portion 123*a* is not provided in areas of the second reflective surface 123 at both ends in the right-left direction and on the front side in the front-back direction, but it is not limiting. The prism portion 123*a* may be provided also on each of these areas. Moreover, shapes, dimensions and the like of the plurality of prism portions 123*a* may be different from each other in the front-back direction, the right-left direction, and the up-down direction. Note that in FIG. 11, the configuration in which the prism portion 123*a* is not disposed in the area along the edge side 123*c* of the second reflective surface 123 is used as an example, but it is not limiting, and the prism portion 123*a* may be disposed in the area. In other words, the prism portion 123*a* may be disposed up to a position in contact with the edge side 123*c*.

The curved portion 123*e* is disposed so that a center part in the right-left direction coincides or substantially coincides with the focal position S of the emission surface 26, which will be described later. The curved portion 123*e* forms the cutoff line CL (see FIG. 13). On the curved portion 123*e*, a step portion 123*f* is provided. The step portion 123*f* forms the diagonal cutoff line CLa (see FIG. 13) in the cutoff line CL. In the step portion 123*f*, an inclination direction is set in accordance with inclination of the cutoff line CLa.

Transmission Surface

The transmission surface 124 is provided in a stepped state from an end portion on the rear of the second reflective surface 123 to the outer side of the light guide. In this embodiment, the transmission surface 124 is provided on the lower side from the edge side 123*c* on the rear in the second reflective surface 123. The transmission surface 124 transmits a part of the light having reached a front side of the second reflective surface 123 (rear side from the second reflective surface 123) in the front-back direction in the light reflected by the first reflective surface 22 to an outside. The transmission surface 124 is disposed so that the light transmitted through the transmission surface 124 travels along an outer surface side of the second reflective surface 123.

The transmission surface 124 has a diffusion portion 124*a* that diffuses light in the right-left direction. As shown in FIG. 11, the diffusion portion 124*a* has a band-like shape extending in the up-down direction. The diffusion portions 124*a* are provided in plural in a state aligned in the right-left direction. In this embodiment, the diffusion portion 124*a* is provided across the entire transmission surface 124, but it is not limiting. The diffusion portion 124*a* may be provided on a part of the transmission surface 124. Moreover, the plurality of diffusion portions 124*a* are provided with the same or substantially the same shapes, dimensions and the like, but it is not limiting. The plurality of diffusion portions 124*a* may differ from each other in the shapes, dimensions and the like.

Re-Incident Surface

The re-incident surface 125 is provided so as to face the transmission surface 124 on the lower side in the vehicle-mounted state from the edge side 123*c* on the emission surface 26 side in the second reflective surface 123. The re-incident surface 125 causes the light transmitted from the transmission surface 124 to the outside to be re-incident. The re-incident surface 125 has a shape curved toward the light source 10 side from both ends in the right-left direction to the center.

Emission Surface

The emission surface 26 emits the light internally reflected by the first reflective surface 22 and the second reflective surface 123 and the light incident from the re-incident surface 125 and emits the light distribution pattern P (FIG. 13) toward the front of the vehicle. The emission surface 26 is formed having a curved surface shape so as to have a focus at a position which coincides or substantially coincides with the focal position S.

Operation

Figure 12:
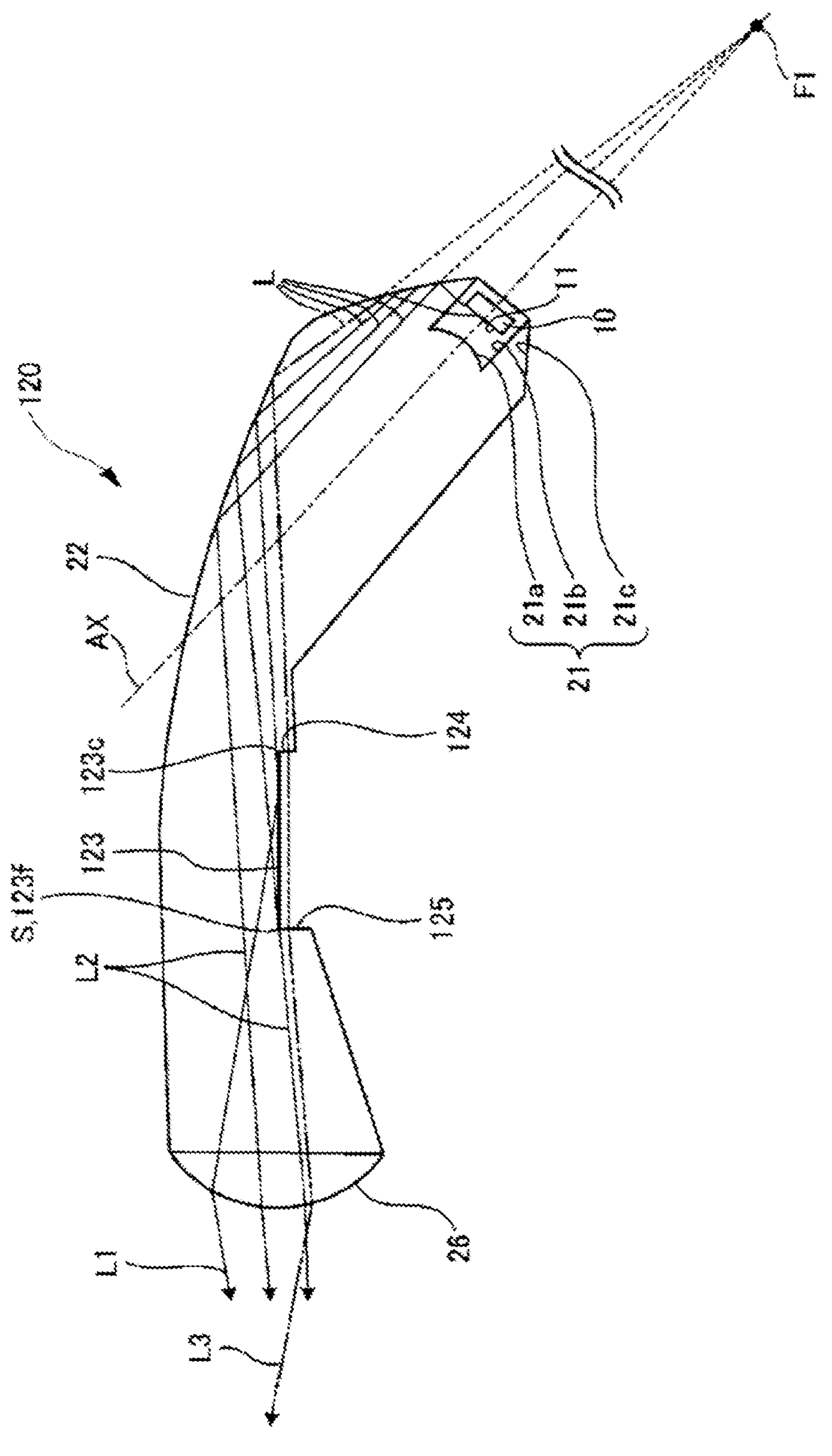
FIG. 12 is a diagram illustrating an example of the optical path of the light incident on the vehicle light guide.
Figure 13:
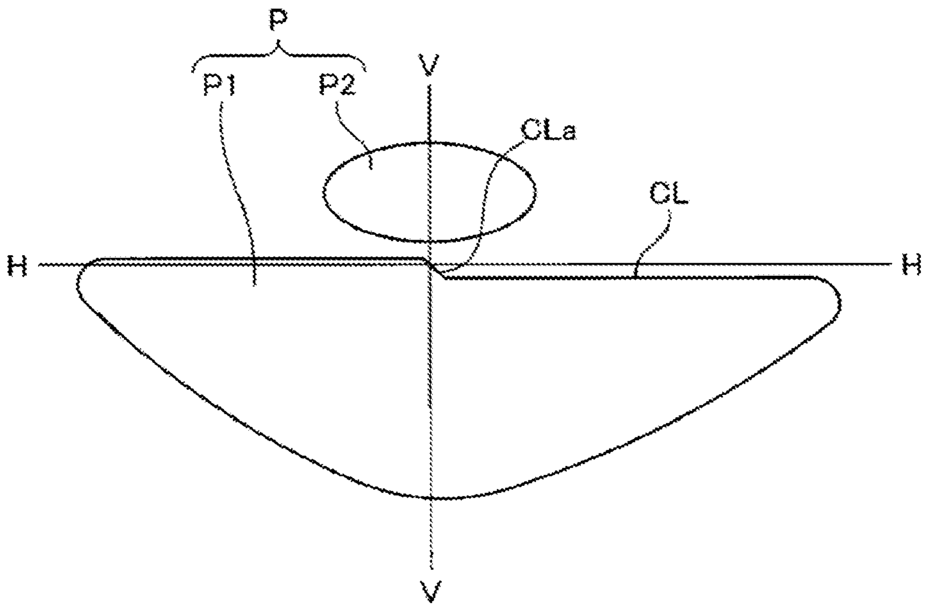
FIG. 13 is a diagram illustrating an example of the light distribution pattern emitted to the virtual screen in front of the vehicle.

Subsequently, an operation of the vehicle headlight 200 configured as above will be described. FIG. 12 is a diagram illustrating an example of the optical path of the light incident on the vehicle light guide 120. FIG. 13 is a diagram illustrating an example of the light distribution pattern P emitted on a virtual screen in front of the vehicle and illustrates the pattern corresponding to a vehicle traveling on the left side of the road. In FIG. 13, a V-V line indicates a vertical line of the screen and an H-H line indicates a right-left horizontal line on the screen. Herein, an intersection between the vertical line and the horizontal line is assumed to be a reference position in the horizontal direction.

By turning on the light source 10 of the vehicle headlight 200, light is emitted from the light emitting surface 11. This light L is incident from the first surface 21*a* and the second surface 21*b* of the incident surface 21 to the vehicle light guide 120. The light L incident from the first surface 21*a* travels toward the first reflective surface 22 side. The light L incident from the second surface 21*b* is internally reflected by the incident-side reflective surface 21*c* toward the first reflective surface 22 side. The light L having reached the first reflective surface 22 is internally reflected toward the second reflective surface 123 in the first reflective surface 22.

A part of light L internally reflected by the first reflective surface 22 (hereinafter, referred to as light L1) reaches the second reflective surface 123. The light L1 having reached the second reflective surface 123 is internally reflected by the second reflective surface 123 and reaches the emission surface 26. In addition, a part of the light L internally reflected by the first reflective surface 22 (hereinafter referred to as light L2) exceeds the second reflective surface 123 and the focal position S to reach the emission surface 26. The light L1 and L2 emitted from the emission surface 26 is, as shown in FIG. 13, emitted to the front of the vehicle as the light distribution pattern P having the cutoff line CL. In FIG. 13, the state in which the diagonal cutoff line CLa in the cutoff line CL is formed so as to be inclined downward toward the left side is described as an example, but this is not limiting, and the similar explanation can be given also for a case where the diagonal cutoff line is inclined downward toward the right side.

In addition, a part other than the aforementioned light L1 and light L2 in the light L internally reflected by the first reflective surface 22 (hereinafter, referred to as light L3) travels toward the lower side of the second reflective surface 123, for example, and reaches the transmission surface 124. The light L3 having reached the transmission surface 124 is transmitted through the transmission surface 124, travels on the outer surface side of the second reflective surface 123 along the second reflective surface 123 and is incident on the re-incident surface 125. The light L3 having been incident on the re-incident surface 125 reaches the lower part of the emission surface 26. This light L3 is emitted to the outside from the lower part of the emission surface 26. The light L3 emitted from the emission surface 26 is, as shown in FIG. 13, emitted as the overhead pattern P2 above the light distribution pattern P in front of the vehicle.

Note that, as shown in FIG. 10 or FIG. 12, when the light L (L1, L2, L3) emitted from the light source 10 and traveling toward the first reflective surface 22 is traced in the opposite direction, it is virtually focused at the position of the first focus F1. Therefore, the light emitted from the light source 10 goes toward the first reflective surface 22 on the optical path as if it were the light emitted at the first focus F1.

As described above, the vehicle light guide 120 according to this embodiment includes the incident surface 21 on which the light from the light source is incident, the first reflective surface 22 that internally reflects the light incident from the incident surface 21 toward the front, the second reflective surface 123 that internally reflects a part of the light reflected by the first reflective surface 22 toward the front, the transmission surface 124 which is provided in a stepped state from the rear of the second reflective surface 123 toward the outer side of the light guide and transmits a part of the light reflected by the first reflective surface 22 to the outer side of the light guide, the re-incident surface 125 which is provided so as to face the transmission surface 124 from the front of the second reflective surface 123 toward the outer side of the light guide and on which the light transmitted from the transmission surface 124 to the outer side of the light guide is re-incident, and the emission surface 26 having the curved surface with the focal position S at the position which coincides or substantially coincides with the edge side 123*b* on the front of the second reflective surface 123, emits the light internally reflected by the first reflective surface 22 and the second reflective surface 123 and the light incident from the re-incident surface 125, and emits the light distribution pattern P to the front of the vehicle.

According to this configuration, a part of the light toward the front side of the second reflective surface 123, for example, in the light incident from the incident surface 21 and reflected by the first reflective surface 22 is transmitted through the transmission surface 124 and reaches the emission surface 26 via the re-incident surface 125. Therefore, the light that cannot be fully controlled by the first reflective surface 22 and the second reflective surface 123 can be caused to reach the emission surface 26 without a loss. As a result, the light utilization efficiency can be improved.

In the vehicle light guide 120 according to this embodiment, the transmission surface 124 is formed so that the light transmitted through the transmission surface 124 travels along the second reflective surface 123. As a result, the light transmitted through the transmission surface 124 can be reliably caused to reach the re-incident surface 125.

In the vehicle light guide 120 according to this embodiment, the transmission surface 124 and the re-incident surface 125 are perpendicular or substantially perpendicular to the second reflective surface 123. As a result, the light transmitted through the transmission surface 124 can be more reliably caused to reach the re-incident surface 125.

In the vehicle light guide 120 according to this embodiment, the transmission surface 124 has the diffusion portion 124*a* that diffuses the light in the right-left direction in the vehicle-mounted state. As a result, spread of the pattern (in this case, the overhead pattern P2) by the light to right and left can be adjusted. In addition, since the diffusion portion 124*a* is provided on the transmission surface 124, that is, it is provided on the edge side 123*c* side, which is farther away from the focal position S than the edge side 123*b* side, the light is sufficiently diffused as it passes through the vicinity of the focal position S. Thus, the overhead pattern P2 having a left-to-right spread can be formed.

In the vehicle light guide 120 according to this embodiment, the second reflective surface 123 has the curved portion 123*e* with a shape which is curved to the rear side in the front-back direction from both sides in the right-left direction to the center in the vehicle-mounted state on a part of the edge side 123*b* on the front in the front-back direction, and the re-incident surface 125 has a shape following the curved portion 123*e*. Therefore, by configuring the shape of the re-incident surface 125 so as to follow the curved portion 123*e*, a surface for forming the edge side 123*b* between it and the second reflective surface 123 can be used as the re-incident surface 125.

In the vehicle light guide 120 according to this embodiment, the first reflective surface 22 has a shape based on the ellipsoid surface EL having the first focus F1 at a position on the optical axis AX of the light source 10 and on the side opposite to the light emission direction, and the second focus F2 at a position which coincides and substantially coincides with the focal position S. In this configuration, when the light emitted from the light source 10 and traveling toward the first reflective surface 22 is traced in an opposite direction, it is virtually focused at a position of the first focus F1. Therefore, the light emitted from the light source 10 goes toward the first reflective surface 22 on the optical path as if it were the light emitted at the first focus F1. As a result, since conventionally developed design arts can be applied to the configuration of the first reflective surface 22, the design can be performed efficiently.

The vehicle headlight 200 according to this embodiment includes the light source 10 and the vehicle light guide 120 which guides light from the light source 10, emits the light, and emits the light distribution pattern P to the front of the vehicle. According to this configuration, since the vehicle light guide 120 which can improve the light utilization efficiency is provided, the light from the light source 10 can be used to efficiently emit the light distribution pattern P to the front of the vehicle.

The technical scope of the present invention is not limited to the above embodiment, and changes may be made as appropriate within a range without departing from the spirit of the present invention. For example, in the above embodiment, the configuration in which the re-incident surface 125 is formed so that the light incident on the re-incident surface 125 reaches the lower side of the emission surface 26 is described as an example, but it is not limiting. It may be so configured that the re-incident surface 125 is formed so that the light incident on the re-incident surface 125 reaches the center or the upper side of the emission surface 26.

In addition, in the above embodiment, the configuration in which the diffusion portion 124*a* is provided on the transmission surface 124 is described as an example, but it is not limiting. It may be also so configured that the diffusion portion 124*a* is not provided on the transmission surface 124. Moreover, the diffusion portion 124*a* provided on the transmission surface 124 is configured to diffuse light in the right-left direction, but it is not limiting. The diffusion portion 124*a* may be configured to diffuse light in the up-down direction.

Moreover, in the above embodiment, the configuration in which the edge side 123*b* of the second reflective surface 123 has the curved portion 123*e* is described as an example, but it is not limiting. The edge side 123*b* of the second reflective surface 123 may be linear. In this case, the re-incident surface 125 extending downward from the edge side 123*b* can be the planar shape along the edge side 123*b*.

Moreover, in the above embodiment, the case in which the first reflective surface 22 has the shape based on the ellipsoid surface EL having the first focus F1 at the position on the optical axis AX of the light source 10 and on the side opposite to the light emission direction and the second focus F2 at the position which coincides and substantially coincides with the focal position S is described as an example, but it is not limiting, and other shapes may be used.

Moreover, in the above embodiment, in the vehicle headlight 200, the configuration in which the light source 10 is disposed at a lower part of the vehicle light guide 120, and the vehicle light guide 120 guides the light diagonally upward is described as an example, but it is not limiting. For example, the vehicle headlight may be configured such that the light source is disposed on the upper part of the vehicle light guide, and the vehicle light guide 120 guides the light diagonally downward. In other words, the configuration may be inverted in the up-down direction with respect to the configuration of the above embodiment. Moreover, the vehicle headlight may be configured to be inclined around an axis with the front-back direction as the center axis with respect to the above configuration.

DESCRIPTION OF REFERENCE NUMERALS

AX Optical axis
CL Cutoff line
CLa Diagonal cutoff line
EL Ellipsoid surface
F1 First focus
F2 Second focus
L, L1, L2, L3 Light
P Light distribution pattern
S Focal position
10 Light source
11 Light emitting surface
13 Substrate
20 Vehicle light guide
21 Incident surface
21*a* First surface
21*b* Second surface
21*c* Incident-side reflective surface
22 First reflective surface
23 Second reflective surface
23*a* Prism portion
23*b*, 23*c* Edge side
23*d* Linear portion
23*e* Curved portion
23*f* Notch portion
24 Step portion
25 Inclined portion
25*a* Low-side inclined portion
25*b* High-side inclined portion
26 Emission surface
30 Mounting member
100 Vehicle headlight
P1 Low-beam pattern
P2 Overhead pattern
120 Vehicle light guide
123 Second reflective surface
123*a* Prism portion
123*b*, 123*c* Edge side
123*d* Linear portion
123*e* Curved portion
123*f* Step portion

124 Transmission surface
124*a* Diffusion portion
125 Re-incident surface
200 Vehicle headlight

The invention claimed is:

1. A vehicle light guide, comprising:

an incident surface on which light from a light source is incident;

a first reflective surface that has a first focus that positions on a front in a front-back direction in a vehicle-mounted state and internally reflects the light incident from the incident surface toward the first focus;

a second reflective surface internally reflecting the light reflected by the first reflective surface toward the front in the front-back direction; and an emission surface that emits the light internally reflected by the first reflective surface and the second reflective surface and emits a light distribution pattern to a front of the vehicle, wherein the first focus of the first reflective surface positions at an edge side on the front in the front-back direction of the second reflective surface, and an end portion on the front in the front-back direction of the second reflective surface includes an inclined portion which is inclined, toward the edge side, more to a lower side in an up-down direction in the vehicle-mounted state than a portion of the second reflective surface other than the end portion.

2. The vehicle light guide according to claim 1, wherein the edge side includes a curved portion for forming a cutoff line in the light distribution pattern on an end portion on the front in the front-back direction; and the inclined portion is disposed at a position corresponding to the curved portion.

3. The vehicle light guide according to claim 1, wherein the inclined portion is formed so that dimensions in a right-left direction in the vehicle-mounted state become smaller toward a rear in the front-back direction.

4. The vehicle light guide according to claim 1, wherein the second reflective surface has a step portion for forming a diagonal cutoff line in the light distribution pattern, and the step portion extends from an end portion on the front in the front-back direction of the second reflective surface toward a rear in the front-back direction in a state inclined to a higher side.

5. The vehicle light guide according to claim 4, wherein the inclined portion is disposed on a lower side of the second reflective surface where a height is lowered by the step portion.

6. The vehicle light guide according to claim 1, wherein the first reflective surface has a shape based on an ellipsoid surface having a second focus at a position on an optical axis of the light source and on a side opposite to an emission direction of the light, and a position of the first focus coincides or substantially coincides with a position of focus of the emission surface.

7. A vehicle headlight, comprising:

a light source; and the vehicle light guide according to claim 1, which guides and emits light from the light source and emits a light distribution pattern to the front of a vehicle.

8. A vehicle light guide, comprising:

an incident surface on which light from a light source is incident;

a first reflective surface that has a first focus that positions on a front in a front-back direction in a vehicle-mounted state and internally reflects the light incident from the incident surface toward the first focus;

a second reflective surface which internally reflects a part of the light reflected by the first reflective surface toward the front in the front-back direction, wherein the first focus of the first reflective surface positions at an edge side on the front in the front-back direction of the second reflective surface;

a transmission surface which is provided in a stepped state from an edge side on a rear in the front-back direction of the second reflective surface toward an outer side of the light guide and transmits a part of the light reflected by the first reflective surface to the outer side of the light guide;

a re-incident surface which is provided in a stepped state from the edge side on the front in the front-back direction of the second reflective surface toward the outer side of the light guide to face the transmission surface such that the light transmitted from the transmission surface to the outer side of the light guide is re-incident; and an emission surface which has a curved surface having a focus at a position which coincides or substantially coincides with the edge side on the front in the front-back direction of the second reflective surface, emits the light internally reflected by the first reflective surface and the second reflective surface and the light incident from the re-incident surface, and emits a light distribution pattern to a front of the vehicle.

9. The vehicle light guide according to claim 8, wherein the transmission surface is formed so that the light transmitted through the transmission surface travels along the second reflective surface.

10. The vehicle light guide according to claim 8, wherein the transmission surface and the re-incident surface are perpendicular or substantially perpendicular to the second reflective surface.

11. The vehicle light guide according to claim 8, wherein the transmission surface has a diffusion portion that diffuses the light in a right-left direction in the vehicle-mounted state.

12. The vehicle light guide according to claim 8, wherein the second reflective surface has a curved portion having a shape which is curved to a rear side in the front-back direction from both sides in a right-left direction to a center in the vehicle-mounted state on a part of the edge side on the front in the front-back direction; and the re-incident surface has a shape following the curved portion.

13. The vehicle light guide according to claim 8, wherein the first reflective surface has a shape based on an ellipsoid surface having a second focus at a position on an optical axis of the light source and on a side opposite to an emission direction of the light, and a position of the first focus coincides or substantially coincides with a position of a focus of the emission surface.

14. A vehicle headlight, comprising:

a light source; and the vehicle light guide according to claim 8, which guides and emits light from the light source and emits a light distribution pattern to the front of a vehicle.

* * * * *